.179,561
ENTERIC COATED ANTHELMINTIC AND
METHOD OF USING SAME
William F. Kuebler, Jr., Overland Park, Alice I. Goldsby, Prairie Village, Archie M. Lindsey, Overland Park, and Peter D. Nowin, Kansas City, Kans.
No Drawing. Filed Oct. 5, 1962, Ser. No. 228,766
7 Claims. (Cl. 167—53)

This invention relates to a new anthelmintic and to its use.

Practically all domestic animals are subject to infection with helminths of various kinds. For instance, most dogs in the United States and elsewhere are infected with helminths such as tapeworms, roundworms, whipworms and others. These helminths quite often produce a harmful effect as shown by emaciation, poor utilization of food, general discomfort and poor condition, and sometimes death. Since dogs are quite often closely associated with humans, particularly children, there is always the potential danger of cross-infection from the dog to the human. When this happens, the infective larvae enter into the tissues of the host and quite often produce illness and in some cases may cause blindness in children.

Horses harbor many species of helminths and other parasites which may damage the abdominal wall or intestinal tract and result in illness and even death. They retard or impair the growth and interfere with passage of food from the stomach, produce pot bellies and rough coat, diarrhea, and other digestive disturbances. Pigs are commonly infected with lungworms, the red stomach worm, whipworms, and other parasites which adversely affect the growth and condition of the animal. Chickens are often infected with ascarides or tapeworms which adversely affect their rate of growth and egg producing capacity. Sheep are also often infected with various helminths which affect their rate of growth, and even the quantity and quality of their wool. The milk production of cattle is often decreased as a result of helminth infection. It has been estimated that the agriculture economy of the United States suffers an annual loss in excess of 375 million dollars per year as a result of parasitic infections in livestock and poultry.

Many chemical compounds have been found to be effective to some extent against one or more species of helminths. Unfortunately, however, most of the commonly available anthelmintics have disadvantages which tend to limit their use. Some anthelmintics have an anthelmintic spectrum being effective against only some of the common helminths. There appears to be no commercially available anthelmintic effective against species of each of the Taenia, Dipylidium, Ascaridae, Ancylostoma and Trichuris groups. To illustrate more specifically, phenothiazine, which is a widely used anthelmintic, has efficacy against Haemonchus, Chabertia, Oesophagostomum, and partial efficacy against Trichostrongylus, Cooperia, and Ostertagia, and no practical efficacy against Nematoduris, lungworms, tapeworms, or whipworms.

Some anthelmintics have low efficacy against many of the common species of helminths. Some of the available anthelmintics are toxic and some require prolonged periods of treatment during which time the animal must be under the care of a veterinarian.

One of the principal difficulties in treating animals infected with helminths is based upon the fact that very often the animal may be infected with a variety of different kinds of helminths. For example, a sick, debilitated dog submitted to a veterinarian for treatment may be found to be suffering from infection with tapeworms, whipworms, ascarides and hookworms. Since the dog is in poor condition and infected with such a wide variety of helminths, it is necessary that the drug be relatively non-toxic and have a wide anthelmintic spectrum. Very few anthelmintic agents available to the veterinarian fulfill the requirements for proper treatment of such an animal. Certain commercially available anthelmintics are effective against tapeworms, but are not effective against ascarides, whipworms and hookworms. Similarly, some of the available anthelmintics are effective against only whipworms, and some are effective against whipworms, hookworms, and ascarides, but not tapeworms. As will be seen, it would not be possible to treat the animal for all of the various helminths with which it is infected with any of the presently available anthelmintics.

The present invention is based upon our discovery that the compound, dimethyl-1,2-dibromo-2,2-dichloroethyl phosphate, has a wide anthelmintic spectrum, being active against tapeworms, whipworms, hookworms, ascarides, and other helminths. It is relatively non-toxic, inexpensive, effective at low dosage levels and requires only a short period of treatment. This compound is old and has been used as a contact insecticide, but insofar as we are aware, it has not been used internally as an anthelmintic agent. This compound has been found effective against a wide variety of helminths including those of the genera which include the most common infecting helminths.

We have found that dimethyl-1,2-dibromo-2,2-dichloroethyl phosphate is effective and may be used at dosage levels ranging between 5 to 200 mg. per kg of body weight per day depending to some extent upon the species of animal undergoing treatment. In the case of dogs, the preferred dosage level is 10 to 20 mg. per kg. of body weight per day for two or three days.

Inasmuch as the compound has some vesicant properties, probably because of its bromine content, it is preferred that the dosage unit forms be coated to disguise the taste and to prevent emesis. More preferably, the coating should be an enteric one so that the drug is not released until after it has passed the stomach and is in the intestinal tract. Some animals, particularly dogs, vomit very readily and the enteric coating permits the drug to pass through the stomach before it is released. The enteric coating may be any one of the numerous kinds now available to the pharmaceutical manufacturer.

In order that the invention may be illustrated in more particularity a preferred embodiment of it and a description of the manner in which the new dosage units were used as anthelmintic agents with dogs will be given.

*Example*

8.66 kg. of dimethyl-1,2-dibromo-2,2-dichloroethyl phosphate, 26.8 kg. of milk sugar, U.S.P. spray dried, 2.1 kg. of amorphous, colloidal silica (Cab-O-Sil, M–5), and .42 kg. of stearic acid are blended and passed through an 80 mesh screen. The mixture is then pressed into ⅜ inch diameter standard, plain tablets using a rotory tablet press. The pressed tablets are placed in a 36 inch coating pan set to revolve at 30 r.p.m. These tablets are then spray coated with a solution of cellulose acetate phthalate enteric coating having the following composition:

| | percent w./w. |
|---|---|
| Cellulose acetate phthalate | 7 |
| Acetone | 65 |
| Chloroform | 24 |
| Diethyl phthalate | .7 |
| F.D. and C. yellow No. 5 | .01 |
| Methyl alcohol | 3 |
| Carnauba Wax | .29 |

The above solution is sprayed on the tablets with a De Vilbiss AGA gun, spray nozzle No. 765, at an air pressure between 50 and 60 lbs. per sq. inch. The fluid flow is approximately 500 ml. per minute. It is preferred that the relative humidity of the coating room be below 85% and the temperature above 55° F. Approximately two hours are required for the coating of 100,000 tablets. If the tablets become sticky and tend to agglomerate during the coating operation, the fluid flow is shut off and air is blown over the surface of the tablets while the drum is being rotated. After the weight of the tablets has been increased by approximately one-third by the enteric coating, the coating operation may be considered complete. At the end of the coating process, the rotation of the pan is stopped with, however, an occasional rotation (every few minutes) while air is continually forced over the surface of the tablets in the pan. When the tablets are dry, the pan is again set to revolve at 30 r.p.m. and the tablets are wax polished for five minutes. They are then examined to determine their disintegration time by the standard U.S.P. XVI tablet disintegration test, using simulated gastric and intestinal fluids maintained at temperatures of 37° C. ± 2° C. The tablets do not disintegrate during four hours of immersion in simulated gastric fluid but disintegrate completely within two and one-half hours after transferring to simulated intestinal fluid.

In the particular trials about to be described, 72 adult cross-bred dogs were used. Eighteen dogs that were found to be infected with whipworms (*Trichuris vulpis*) were selected and placed in one group. Another group of 18 dogs was selected because of their infection of Ascarides (*Toxocara canis* and *Toxascaris leonina*). In still other groups 18 dogs infected with hookworms (*Ancylostoma caninum* and *Uncinera stenoce phala*) and 18 dogs with tapeworms (*Taenia* and *Dipylidium caninum*) were used. Since these dogs were naturally infected the helminth spectrum in each group included 2 to 6 helminth species in addition to the species selected for study.

The 18 dogs of each group were subdivided into three groups of 6 dogs each. In the tapeworm and whipworm groups one group received an oral dose of the above described enterically-coated tablets at dosage levels of 15 mg. per kg. of body weight once daily for two days. The second group received an oral dose of the tablets at a level of 15 mg. per kg. once daily for three days. The third group served as controls and received no medication.

In the ascarid and hookworm groups one subgroup was given 15 mg. per kg. of body weight of the drug once and a second group was administered the drug at the same level but twice on succeeding days. The third group served as controls.

The feces of each dog was examined for four days following the day of medication for consistency, presence or absence of worms and tablet fragments. The feces of each dog was also examined for the presence of ova on the day of medication and for six days thereafter. The dogs were sacrificed within 7 to 10 days after the last day of medication and thoroughly examined. The following results were observed.

In the whipworm groups no vomition occurred during the trial and no symptoms of toxication were observed.

Four days after the initial medication no whipworm, hookworm, ascarid or tapeworm ova were found in the feces of the dogs of the thrice-treated group. One dog of the twice-treated group was found to have ova in the feces. The ova numbers in the feces of the control group of dogs remained at approximately the premedication level.

The feces of the control dogs remained well formed while some of the dogs in the medicated group had loose stools containing mucus, tablet fragments, and helminths.

On the fourth day after medication, all the stools of the dogs in the medicated groups were firm in consistency.

When the dogs were examined at necropsy, no helminths were found in the thrice-medicated group, and only tapeworms were found in two of the six dogs in the twice-medicated group. All the dogs of the control group were infected with whipworms and hookworms; two of the dogs with ascarides and tapeworms. The control dogs as a group which were negative at necropsy for a particular species of helminth had no ova of this species in their feces at the beginning of the trial. All the control dogs were infected with whipworms.

The gross observation of the visceral organs of each dog revealed some abnormalities of the kidneys. However, the control dogs had more abnormalities in the kidneys than did the medicated dogs.

Five days after the initial medication of the dogs of the ascarid group no helminth ova were located in the feces of the dogs in the twice-medicated group. Five of the dogs in the once group continued to have hookworm ova in their feces and four of the dogs of this group continued to have ascarid ova in their feces. The ova numbers in the feces of the control group of dogs remained at approximately the premedication level.

The feces of the control dogs varied from loose to formed as a group. The feces of the twice and thrice medicated groups varied from loose to formed in consistency and contained mucus, a small amount of blood, tablet fragments, and helminths. By the fourth day after medication, the feces of all the medicated dogs had returned to a formed consistency.

When the dogs were examined at necropsy, no helminths were recovered from the dogs of the twice-medicated group. Three of the dogs of the once group were still infected with hookworms and two with ascarides when necropsied. All of the control dogs were infected with whipworms, ascarides, and hookworms, and four of the dogs with tapeworms.

No vomitions occurred in the hookworm group, nor were there any signs of toxicity. Six days after medication no whipworm or tapeworm ova were observed in the feces of the dogs of the twice group; however, one dog had hookworm ova in its feces and three dogs had ascarid ova.

In the once group, no whipworm ova were observed; but three of the dogs had hookworm ova, one had ascarid ova, and two had tapeworm ova in the feces.

The number of ova in the feces of the control group of dogs remained at approximately the premedication level.

The feces of the control dogs was well formed as a group. That of the medicated dogs contained tablet fragments, mucus, an occasional spot of blood, and worms. With the exception of one dog of the twice group, all the feces had returned to normal by the fourth day after medication.

At necropsy, one of the dogs of the twice group was infected with hookworms and one with tapeworms. Two of the dogs were infected with ascarides. Three of the dogs of the once group were infected with hookworms, one with ascarides, and four with tapeworms. All of the dogs of the control group were infected with hookworms, three with whipworms, three with ascarides, and five with tapeworms. As a group, the dogs which were negative at necropsy were also negative when the premedication ova counts were examined.

The gross observation of the visceral organs of each dog revealed the same general picture of abnormalities as that described for the whipworm group. Abnormalities were few in number, and in no instance could any abnormality be attributed to toxicity of the drug.

One dog of the twice-treated tapeworm group vomited after each medication. Prior to medication the dog vomited several times, had diarrhea, and would not take food. No symptoms of toxication were observed in the twelve medicated dogs during the trial.

Four days after the initial medication essentially no hookworm, whipworm, or tapeworm ova were found in the feces of the six dogs of the thrice-medicated group. Ascarid ova were found in one dog. One dog of the twice-medicated group retained its hookworm infection. No whipworm or ascarid ova were found in the feces of the six dogs of the twice-medicated group. The helminth ova numbers in the feces of the control group dogs remained at approximately the premedication level.

When the dogs were examined at necropsy, no hookworms were recovered from the dogs of the thrice-medicated group. No whipworms were found in four dogs of the thrice group which prior to medication had whipworm ova in their feces. Five of the six dogs were infected with tapeworms of the genus Dipylidium and one with Taenia. In the twice-medicated group, no hookworms were recovered from five of the six dogs. Four of the dogs were infected with tapeworms of the genus Dipylidium and three with Taenia. Three of the dogs of the control group were infected with hookworms and ascarides, five with Dipylidium, and three with Taenia.

The gross observation of the visceral organs of each dog revealed four of the twelve medicated dogs with slight abnormalities of the kidneys. All other organs appeared normal. The kidney abnormalities were fibrotic in nature and could not be connected to drug toxicity. This condition was observed in both medicated and non-medicated dogs.

If the 72 dogs in the four groups (whipworm, ascarid, hookworm, and tapeworm) are evaluated as a whole, a number of points become clear. First, it is apparent that a small percentage of the dogs failed to lose their hookworm, ascarid, or tapeworm infections after medication. This is not unusual to those who are accustomed to investigating anthelmintics as it quite often occurs even with the best anthelmintics. Secondly, it is also apparent that medication of the dogs at the 15 mg./kg. of body weight on two consecutive days is the most effective level, and thirdly, that the enteric-coated tablets are an excellent broad spectrum anthelmintic. This spectrum of efficacy includes whipworms, ascarides, hookworms, and to a lesser degree, tapeworms.

It is also apparent that the drug produces a slight loosening of the stools. This is not an undesirable feature since it hastens the movement of drug and the dead or dying helminths down the digestive tract. This decreases the amount of drug which is absorbed from the digestive tract and also lessens the chance of toxication as the result of absorbing the proteins of dead helminths. The stools are back to normal within four days, so the dogs are not subjected to dehydration. Occasionally, a few spots of blood were observed in the feces. The blood could not be attributed to drug toxicity because blood was also seen in the stools of the control dogs. Blood is seen in the feces of kennel dogs routinely and is attributed to hookworm infection.

No consistent pattern of gross pathology attributable to organic phosphate poisoning was observed at necropsy. All organs appeared normal with the exception of an occasional pinpoint area of liver fibrosis or fibrotic infarcts of the kidney indicating past history of disease conditions. This condition was observed in both medicated and non-medicated dogs. Post-mortem of a large number of dogs during a two-year period consistently reveals lesions of varying degrees of chronic interstitial nephritis.

To determine more exactly the anthelmintic efficacy of the enterically-coated tablets described above against canine tapeworms of the genus Taenia, additional trials were run. Eighteen adult cross-bred dogs which were infected with Taenia were apportioned into three groups of six by a random process. One group of six dogs received an oral dose of one 75 mg. tablet, representing a dosage level of approximately 15 mg. per kg. of body weight, once daily for three consecutive days. One group of 6 dogs received oral dosages of one 75 mg. tablet once daily for five consecutive days. One group of six dogs received no medication and were used as controls.

The feces of each dog was examined for seven days following the first day of medication for consistency (loose formed), presence or absence of tablet fragments, and mucus. Feces from each dog were also examined for the presence of ova on the day of medication and for six days thereafter. A sugar flotation technique was used for the fecal examination.

The dogs were sacrificed on the eighth and ninth day after the last day of medication. As each dog was sacrificed, the intestine was removed, cut open with scissors, and placed in cold water until thoroughly chilled. The intestinal surfaces were then washed three times and the intestinal contents examined for the presence of helminths by use of an illuminated glass top box and a glass dish. The helminths were removed from the intestinal contents and counted. If a dog was infected with Dipylidium, the intestinal washings and intestinal contents were examined with a dissecting microscope for the presence of tapeworm scolices.

Vomition occurred in one dog of the thrice-medicated group and one dog of the control group three days after the first day of medication. Three dogs of the group that received medication five times vomited. One dog vomited one day after the first day of medication; one dog vomited three days after the first day of medication; and one dog vomited six days after the first day of medication. No symptoms of drug toxication were observed during the medication period.

Four days after the initial medication, no helminth ova were found in the feces of five of the six dogs in the thrice-medicated group. Taenia ova were observed in the feces of one dog. Six days after the initial medication, no helminth ova were located in the feces of four of the six dogs which received medication five times. Taenia ova were observed in the feces of two of the six dogs. The ova number in the feces of the control group remained approximately at the premedication level.

The consistency of the feces of the control dogs varied from loose to formed as a group during the experimental period. The feces of the two medicated groups varied from loose to formed consistency and contained tablet fragments, mucus, and helminths. By the seventh day after the first medication, the feces of nine of twelve of the medicated dogs had returned to a formed consistency.

When the dogs were examined at necropsy, no helminths were recovered from three dogs of the thrice-medicated group. One dog was infected with hookworms and tapeworms (Taenia), one dog with tapeworms (Dipylidium), and one with tapeworms (Taenia). No helminths were recovered from four of the six dogs from the group that received the medication five times. One of the dogs was infected with tapeworms (Taenia and Dipylidium) and one with Taenia. All of the six control dogs were infected with Taenia pisiformis, four with Dipylidium, four with Trichuris and ascarides, and three with hookworms.

Observation of the visceral organs at necropsy revealed no consistent pattern of gross pathology which could be attributed to organic phosphate poisoning. All organs appeared normal with the exception of two dogs which were sick with distemper. Examination of the lungs of the distemper dogs revealed pneumonic lesions in several lobes.

Excellent anthelmintic efficacy for canine ascarides, hookworms, whipworms, and tapeworms of the genus Taenia was obtained at both medication levels. By the fifth day of medication, no ascarid, hookworm, or whipworm ova were observed in the feces of the twelve medicated dogs and only two had Taenia ova in the feces.

Summarization of the foregoing and other results have led to the following conclusions as shown in the table below:

| Worm | Dose, mg./kg. wt. | Number of Consecutive Days Admin. | Estimated percent efficacy |
|---|---|---|---|
| Hookworm | 15 | 1 | 85 |
| Do | 15 | 2 | 98 |
| Do | 15 | 2 | 100 |
| Do | 15 | 2 | 70 |
| Do | 15 | 3 | 100 |
| Ascarid | 15 | 1 | 89 |
| Do | 15 | 2 | 100 |
| Whipworm | 15 | 2 | 100 |
| Do | 15 | 3 | 100 |
| Tapeworm | 15 | 3 | 94 |
| Do | 15 | 5 | 99 |

The foregoing represent only a few results from many trials that have been run. It will be understood, of course, that the efficacy of the enteric-coated tablets will vary from animal to animal depending upon the extent of the infestation, the animal's condition, diet, opportunity for reinfestation, and other conditions. The enteric-coated tablets described above have been used in the field by veterinarians and have been found to be exceptionally effective and non-toxic.

Dimethyl-1,2-dibromo-2,2-dichloroethyl phosphate has also been found to be effective against helminths other than those specifically mentioned above. The ones studied are, however, the most prevalent.

Acute and chronic toxicity studies have shown that the enterically-coated dimethyl-1,2-dibromo-2,2-dichloroethyl phosphate tablets are relatively nontoxic. It was not possible, for instance, to determine the $LD_{50}$ dose of the drug in dogs. When dogs were administered a single dose of the drug equivalent to 400 mgs. per kg. of body weight, there was no evidence of toxicity except that all of the dogs vomited within 24 hours after medication and showed slight diarrhea. When dogs were given 30 mgs. per kg. of body weight per day for two weeks, there was no evidence of toxicity. Chemical analysis indicates that approximately 95 percent of the bromide content of the drug is systemically absorbed in eight hours at dosage levels of 7.8 mgs. per kg. of body weight, and within 24 hours at 16.2 mgs. per kg. of body weight. The bromide content is eliminated in the urine. A small amount of the drug passes in the feces and urine and remains effective against flies and other insects.

It has also been found that dimethyl-1,2-dibromo 2,2-dichloroethyl phosphate is effective against helminths in pigs, sheep and goats. There appears to be no reason why the compound would not also be effective in chickens, horses, cattle, and other animals which are commonly infected with helminths, as well as in humans.

The enteric coating should be of such character as to release the drug formulation just beyond the pyloric sphincter, and the formulation should be so designed for release of active drug throughout the length of the intestinal tract. As will be apparent from the foregoing studies, dogs and most other animals are infested with a variety of helminths at the same time. The tablets described above, however, have been found to be of the desired characteristics for dogs infected with a variety of helminths.

Various coating materials, in addition to cellulose acetate phthalate, may be used to enterically coat the tablets. Reaction products of cellulose acetate, cellulose propionate, cellulose acetate butyrate, methyl cellulose, butyl cellulose and the like with phthalic or maleic anhydrides or the like, are known enteric-coating materials and may be used in practicing the present invention. The properties of the coating may be varied by controlling the free carboxyl content of the coating material, the coating thickness, and in other known ways. Shellac, salol, keratin, and various natural and synthetic waxes and polymers may also be used in accordance with the description found in Remington's "Practice of Pharmacy," 11th edition (1956), pages 407–412.

The dimethyl-1,2-dibromo-2,2-dichloroethyl phosphate may also be incorporated in tablets which release the drug over a predetermined period of time while passing through the intestinal tract. Many such formulations have been described and may be used with or without enteric coatings. As noted above, the essential requirement is to formulate the drug in a dosage unit form whereby the vesicant action of the drug does not cause emesis or vomiting of the medication before it has had a chance to act upon the helminths in the digestive tract and to prepare a formulation that is released in the habitat of like species of helminth which infect the host. This would be in any area from the anterior part of the true stomach to the rectum.

The preferred manner of administering the enterically coated dosage unit forms of the present invention is to withhold normal feeding for 8 to 12 hours, then give a light feeding and immediately thereafter administer the recommended dose of 10 to 20 mg. per kg. of body weight of dimethyl-1,2-dibromo-2,2-dichloroethyl phosphate. Normal feeding may then follow, but where the dose is repeated on consecutive days, the food should be withheld for a period of 8 to 12 hours before the repeat dose is given. Although one single dosage may in many cases eliminate the helminths, it is preferred that 2 or 3 single dosages be given on consecutive days. In the case of heavy infestation of helminths, the dosage schedule may continue for as long as a week.

In view of the fact that animals which may be treated in accordance with the present invention will vary in size considerably, the individual dosage units used in the treatment will also vary considerably. Chickens and turkeys may, for example, receive individual doses of 15 to 600 mg. of the drug. These dosage levels might be supplied by a number of individual dosage units. In the case of ruminants the individual dosage units may vary from 100 to 50,000 mg. of active drug. Ordinarily the larger size animals would be given a plurality of individual enterically coated dosage units.

We claim:

1. A composition of matter for the control of helminths which comprises in dosage unit form an anthelmintically effective amount of dimethyl-1,2-dibromo-2,2-dichloroethyl phosphate covered with an enteric coating of a sufficient thickness to prevent release of the chemical in the stomach, but permitting disintegration of the dosage unit in the intestinal tract.

2. A composition of matter adapted to remove helminths from the intestinal tract of animals which comprises 15 to 50,000 mgs. of dimethyl-1,2-dibromo-2,2-dichloroethyl phosphate in a dosage unit form covered with an enteric coating of a sufficient thickness to prevent release of the chemical in the stomach, but permitting disintegration of the dosage unit in the intestinal tract.

3. A dosage unit form as defined in claim 2 in which the enteric coating is cellulose acetate phthalate.

4. A method of controlling helminths in animals which comprises the step of orally administering an enterically coated form of dimethyl-1,2-dibromo-2,2-dichloroethyl phosphate and thereby introducing the said compound in the intestinal tract of a helminth infested animal.

5. A method of controlling helminths in animals which comprises the step of releasing 5 to 200 mg. per kg. of body weight of dimethyl-1,2-dibromo-2,2-dichloroethyl phosphate in the intestinal tract of a helminth infested animal by orally administering to said animal 5 to 20 milligrams per kilogram of body weight of said compound in a form adapted to pass through the stomach of the animal without disintegration.

6. A method of removing helminths from the intestinal tract of animals which comprises orally administering 5 to 200 mg. per kg. of body weight of dimethyl-1,2-dibromo-2,2-dichloroethyl phosphate in an enterically coated dosage unit form whereby the chemical is released in the presence of the helminths in the infested animal.

7. A method in accordance with claim 6 in which the dosage of the enteric coated drug is repeated at least three times.

References Cited by the Examiner

UNITED STATES PATENTS 2,971,882  2/61  Ospenson.

OTHER REFERENCES

Levine: Am. J. Vet. Research, vol. 29, 1958, pages 299–303.

Radeleff: J. Am. Vet. Med. Assn., vol. 136, No. 11, June 1, 1960, pages 529–537.

JULIAN S. LEVITT, *Primary Examiner.*

FRANK CACCIAPAGLIA, JR., LEWIS GOTTS, *Examiners.*